US006966489B2

(12) United States Patent
Grant

(10) Patent No.: US 6,966,489 B2
(45) Date of Patent: Nov. 22, 2005

(54) TOLLING INFORMATION EXCHANGE METHOD AND SYSTEM

(75) Inventor: Bradley John Grant, Melbourne (AU)

(73) Assignee: CityLink Melbourne Limited, Melbourne (AU)

( * ) Notice: Subject to any disclaimer, the term of this patent is extended or adjusted under 35 U.S.C. 154(b) by 0 days.

(21) Appl. No.: 10/481,906

(22) PCT Filed: Jun. 27, 2002

(86) PCT No.: PCT/AU02/00839

§ 371 (c)(1), (2), (4) Date: May 19, 2004

(87) PCT Pub. No.: WO03/003314

PCT Pub. Date: Jan. 9, 2003

(65) Prior Publication Data

US 2004/0206817 A1 Oct. 21, 2004

(30) Foreign Application Priority Data

Jun. 27, 2001 (AU) .................................... PR5947

(51) Int. Cl.$^{7}$ ................................................ G06F 7/08
(52) U.S. Cl. ....................... 235/381; 235/382; 235/384
(58) Field of Search ................................ 235/381–385; 705/13, 500

(56) References Cited

U.S. PATENT DOCUMENTS 5,086,389 A * 2/1992 Hassett et al. ................ 705/13
5,310,999 A * 5/1994 Claus et al. ................ 235/384
5,485,520 A * 1/1996 Chaum et al. ................ 705/74
5,602,919 A * 2/1997 Hurta et al. .................. 705/65
6,024,286 A * 2/2000 Bradley et al. ............. 235/492
6,263,316 B1 * 7/2001 Khan et al. ................... 705/13
6,342,844 B1 * 1/2002 Rozin ......................... 340/933
6,366,220 B1 * 4/2002 Elliott ........................ 340/928
6,422,464 B1 * 7/2002 Terranova ................... 235/384
6,505,780 B1 * 1/2003 Yassin et al. ............... 235/492
6,647,270 B1 * 11/2003 Himmelstein ............ 455/456.1

FOREIGN PATENT DOCUMENTS

DE 4311996 A 10/1994
JP 2000-322353 A 11/2000
JP 2001-319253 A 11/2001
JP 2002-063243 A 2/2002
WO 99/48052 A 9/1999

* cited by examiner

OTHER PUBLICATIONS

International Search Report for PCT/AU02/00839; ISA/AU; Mailed: Sep. 2, 2002.

*Primary Examiner*—Thien M. Le
*Assistant Examiner*—Kimberly D. Nguyen
(74) *Attorney, Agent, or Firm*—Harness, Dickey & Pierce, PLC

(57) ABSTRACT

A method for debiting tolls against vehicles travelling on multiple toll road networks (2–4), the tolls incurred in each toll road network being processing by a separate toll collection system (4–6), the method including the steps of: (a) creating a local user record identifying a user of a first of the toll road networks in a first local user identification register (19, 20) maintained by a first of the toll collections systems (14); (b) creating a global user record identifying the user in a global user identification register (30–31) maintained by a central tolling information exchange (28); (c) detecting the presence of a user identification device associated with the user on a second toll road network (3); (d) attempting to locate a second local user record identifying the user from a second local user identification register (21, 22) maintained by a second of the toll collection systems (5), and if unsuccessful; (e) attempting to locate the global user record identifying the user from the global user identification register (30, 31), and if successful; (f) deriving a toll charge incurred by the user on the second toll road network.

31 Claims, 8 Drawing Sheets

START
END
Y
N
70
71
72
73
74
75
76
77
78
79
80
81
82
16
25
28
30
31

TOLLING INFORMATION EXCHANGE METHOD AND SYSTEM

CROSS-REFERENCE TO RELATED APPLICATIONS

This application is a US National Stage of International Application No. PCT/AU02/00839 filed 27 Jun. 2002. This application claims the benefit of Australian Application No. PR 5947, filed 27 Jun. 2001. The disclosure(s) of the above applications are incorporated herein by reference.

The present invention relates generally to methods and systems for debiting tolls against vehicles travelling on toll roads, and in particular to toll road debiting method and systems that facilitate information exchange between multiple toll road networks in which tolls incurred in each toll road network are processed by a separate toll collection system.

Various systems currently exist for electronically debiting tolls against vehicles travelling on toll roads. Typically, gantries are arranged so as to span lanes at a number of points within a toll road network Radio communication devices are mounted to each gantry in order to detect vehicles using the toll road system. The passage of each vehicle under a gantry is communicated to a central toll collection system for calculation of a toll charge incurred by each vehicle for travelling on the toll road network.

The user of each vehicle is identified by the detection of a user identification device, such as a vehicle licence place number or electronic transponder mounted in the vehicle, by the communications devices mounted on the gantries. The toll collection system maintains a user identification register of users having an account with the operator of the toll road network, or having otherwise paid for use of the toll road network.

Upon detection of the vehicle licence plate number or electronic transponder mounted in the vehicle passing under a gantry, and the communication of identification information from the communication device to the toll collection system, a check is made in the user identification register to identify whether a corresponding user record exists. If a corresponding user record is found, a toll charge is calculated and the user debited for that toll charge. If no corresponding user record is located, details of the vehicle may be forwarded to an enforcement agency, such as a local police force, for pursuing the unauthorised use of the toll road network.

The use of such toll road networks is becoming increasingly prevalent. Separate toll road networks frequently exist in the same city, state or other geographically close locations. Accordingly, users often have occasion to travel on several separate toll road networks owned and operated by different entities. In toll debiting systems involving the automated calculation and processing of a toll charge, such as the system previously described, users of multiple toll road networks are frequently required to establish separate accounts with the toll collection system of each of the multiple toll road networks, and to purchase and install in their vehicle separate electronic transponders for each toll road networks. This situation is time consuming, costly and complex for users, and discourages use of each of the toll road networks.

There currently exists a need therefore to provide a system and method for debiting tolls against vehicles travelling on multiple toll road networks that ameliorates or overcomes one or more disadvantages of known toll debiting systems.

Moreover, there exists a need to provide a method and system for facilitating the exchange of information between multiple toll road networks owned and operated by different entities.

Preferably, such a method and system should be simple and convenient for both users and administrators of the multiple toll road networks, without requiring significant expenditure to replace existing toll debiting infrastructure.

With this in mind, one aspect of the present invention provides a method for debiting tolls against vehicles travelling on multiple toll road networks, the tolls incurred in each toll road network being processing by a separate toll collection system, the method including the steps of:

(a) creating a local user record identifying a user of a first of the toll road networks in a first local user identification register maintained by a first of the toll collections systems, (b) creating a global user record identifying the user in a global user identification register maintained by a central tolling information exchange, (c) detecting the presence of a user identification device associated with the user on a second toll road network, (d) attempting to locate a second local user record identifying the user from a second local user identification register maintained by a second of the toll collection systems, and if unsuccessful, (e) attempting to locate the global user record identifying the user from the global user identification register, and if successful, (f) deriving a toll charge incurred by the user on the second toll road network.

The global user record may be selectively created for the user, for example, upon or following creation of the first local user record.

The user identification device may include an electronic transponder or vehicle licence plate. The global user identification register may include one or more of a global vehicle register for recording vehicle licence plate numbers, and the global device register for recording electronic transponder identification information.

In one embodiment, the method may further include the step of:

(g) forwarding a toll charge record to the first toll collection system for processing.

Step (g) may include:

transmitting the toll charge record from the second toll collection system to the central tolling information exchange, receiving an acknowledgment from the central tolling information exchange of the toll charge record, and storing reconciliation data in the second toll collection system for later reconciliation with the first toll collection system.

Step (g) may include:

identifying the user as having a first local user record in the local user identification register, transmitting the toll charge record from the central tolling information exchange to the first toll collection system, receiving acknowledgment from the first toll collection system of the toll charge record, and debiting the user for the toll charge incurred in the second toll road network.

The user identification device may include a smart card, or other security device bearing electromagnetically encoded information identifying the user. The global device register may record smart card identification information.

In another embodiment, the method may further include the steps of:

(h) debiting the toll charge within the second toll collection system, and (i) transmitting a toll charge record to the first toll collection system for archiving.

The method may include the step of:

(j) if the attempt to locate the global user record from the global user-identification register at step (e) is unsuccessful, generating an infringement record, and (k) transmitting the infringement record to an enforcement agency.

The method may further include the step of:

(l) maintaining a local action list in each toll collection system identifying unauthorised users of that toll road network, (m) maintaining a foreign action list in each toll collection system identifying unauthorised users of one or more other toll road networks, (n) transmitting each local action list to the central tolling information exchange for redistribution to the other toll collection systems, (o) at each toll collection system, storing received local action lists in the foreign action list, and (p) at each toll collection system, using the local and foreign action lists to initiate one or more predetermined actions upon detection of the user identification device of an unauthorised user.

Another aspect of the invention provides a system for debiting tolls against vehicles travelling on multiple toll road networks, the system including:

a plurality of toll collection systems for processing the tolls incurred in each of the multiple toll road network, a plurality of local user identification registers each maintained by a separate toll collection system, a central tolling information exchange operatively connected to the plurality of toll collection systems, and a global user identification register maintained by the central tolling information exchange, wherein the plurality of toll collection systems and the central tolling information exchange each include processing devices and memory devices storing computer program code causing the processing devices to carry out a method according to any one of the preceding claims.

A further aspect of the invention provides a central tolling information exchange for facilitating the exchange of information between multiple road toll networks, the central tolling information exchange forming part of a system for debiting tolls against vehicles travelling on multiple toll road networks, the tolls incurred in each toll road network being processing by a separate toll collection system, wherein a first local user record identifying a user of a first toll road network is created in a first local user identification register maintained by a first toll collection system, the central tolling information exchange including a processing device and memory device storing computer program code causing the processing device to:

(a) create a global user record identifying the user in a global user identification register maintained by a central tolling information exchange, upon detection of the presence of a user identification device associated with the user on a second toll road network, and unsuccessfully attempting to locate a second local user record identifying the user from a second local user identification register maintained by a second of the toll collection systems, (b) search for a global user record identifying the user from the global user identification register, and (c) transmit the results of the search to the second toll collection system.

Upon a toll charge being incurred by the user on the second road toll network, the computer program code may further cause the processing device to:

forward a toll charge record representative of the toll charge to the first toll collection system.

The computer program code may further cause the processing device to:

receive the toll charge record from the second toll collection system, transmit an acknowledgment of the toll charge record to the second toll collection system.

The computer program code may further cause the processing device to:

selectively create a global user record for the user.

A global user record may be created upon or following creation of the first local user record.

The computer program code may further cause the processing device to:

transmit the toll charge record to the first toll collection system, and receive acknowledgment from the first toll collection system of the toll charge record.

The computer program code may further cause the processing device to:

receive a local action list maintained by the first toll collection system identifying unauthorised users of the first toll road network, and transmit the local action list to the second toll collection system.

Yet another aspect of the present invention provides a toll collection system adapted to exchange information with one or more other toll collection systems, the toll collection system forming part of a system for debiting tolls against vehicles travelling on multiple toll road networks, the tolls incurred in each toll road network being processing by a separate toll collection system, wherein a local user record identifying a user of a first of the toll road networks is created in a first local user identification register maintained by a first of the other toll collections systems, and a global user record identifying the user is created in a global user identification register maintained by a central tolling information exchange, the toll collection system including a processing device and memory device storing computer program code causing the processing device to:

(a) detect the presence of a user identification device associated with the user on a second toll road network, (b) attempt to locate a second local user record identifying the user from a second local user identification register maintained by the toll collection system, and if unsuccessful, (c) attempt to locate the global user record identifying the user from the global user identification register, and if successful, (d) derive a toll charge incurred by the user on the second toll road network.

The computer program code may further cause the processing device to:

forward a toll charge record to the first toll collection system for processing.

The computer program code may further cause the processing device to:

transmit the toll charge record to the central tolling information exchange, receive an acknowledgment from the central tolling information exchange of the toll charge record, store reconciliation data for later reconciliation with the first toll collection system.

The computer program code may further cause the processing device to:

debit the toll charge, and transmit a toll charge record to the first toll collection system for archiving.

The computer program code may further cause the processing device to:

generate an infringement record if the attempt to locate the global user record from the global user identification register is unsuccessful, and transmit the infringement record to an enforcement agency.

The computer program code may further cause the processing device to:

maintain a local action list identifying unauthorised users of the second toll road network, maintain a foreign action list identifying unauthorised users of the one or more other toll road networks, transmit the local action list to the central tolling information exchange for redistribution to the other toll collection systems, store received local action lists in the foreign action list, and use the local and foreign action lists to initiate one or more predetermined actions upon detection of the user identification device of an unauthorised user.

A still further aspect of the present invention provides a computer program including computer program code for causing the central tolling information exchange to perform the above described functionality.

A still further aspect of the invention provides a computer program including computer program code for causing each toll collection system to operate as previously described.

The following description refers in more detail to the various features of the present invention. To facilitate an understanding of the invention, reference is made in the description to the accompanying drawings where the toll debiting system and method are illustrated in a preferred embodiment. It is to be understood however, that the invention is not limited to the preferred embodiment as illustrated in the drawings.

Figure 1:
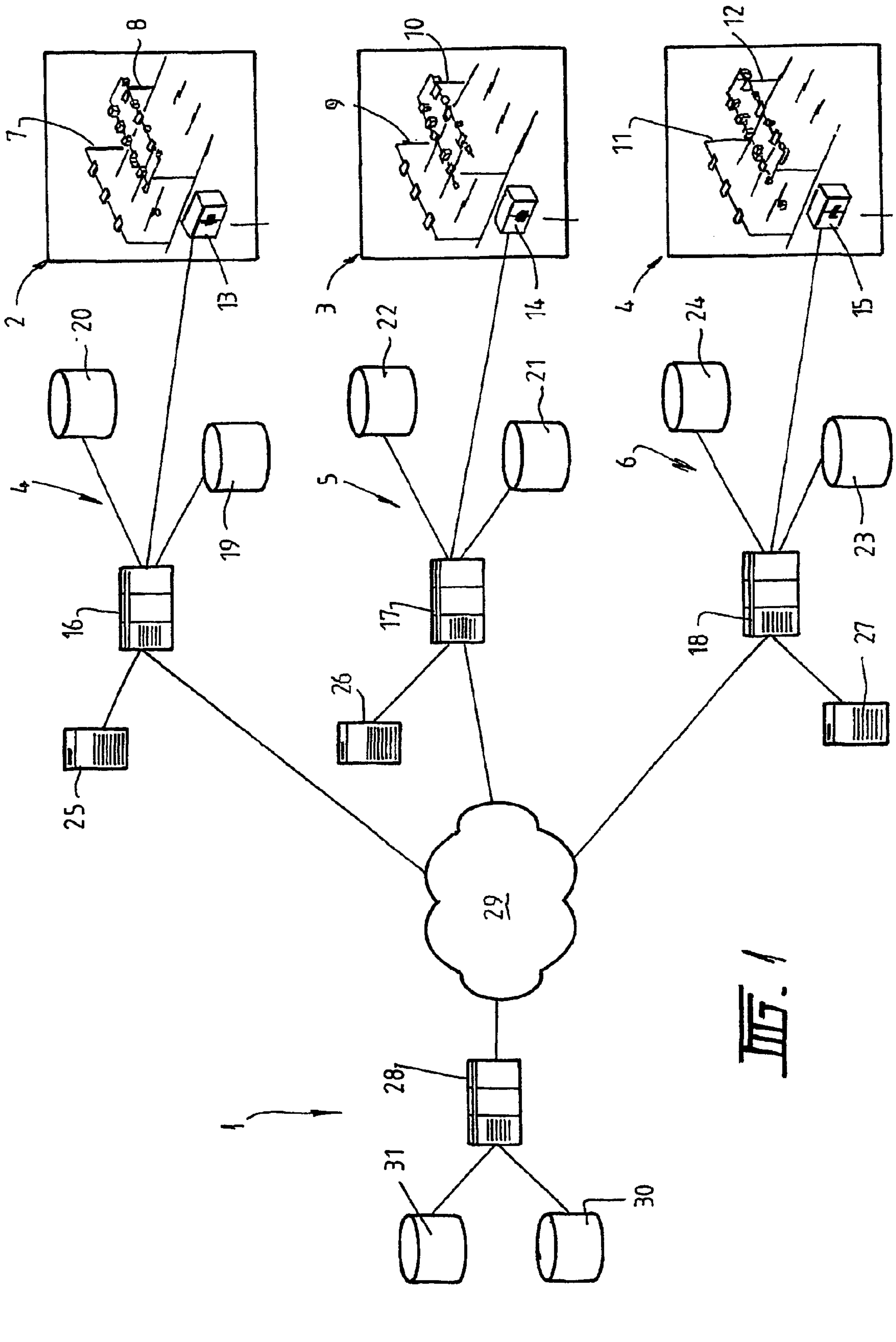
FIG. 1 is a schematic diagram illustrating a system for debiting tolls against vehicles travelling on multiple toll road networks in accordance with the present invention.

Referring now to FIG. 1, there is shown generally a system 1 for debiting tolls against vehicles travelling on multiple toll road networks 2, 3 and 41. Tolls incurred in each toll road network 2, 3 and 41 are processed by separate toll collection systems 4, 5 and 6. Each of the toll road networks 2, 3 and 41 include gantries spanning a predetermined number of lanes of the toll road network in question at one or more locations within the toll road network. In FIG. 1, exemplary gantries 7 and 8 are illustrated as forming part of the toll road network 2, whilst toll road networks 3 and 41 respectively include gantries 9 and 10, and gantries 11 and 12.

Communications devices are mounted to each of the gantries. These communications devices detect the presence of a user identification device fixed to or mounted in a vehicle travelling on the toll road network in close proximity to the gantries. User identification devices detected by the communication devices may include the vehicle licence plate fixed to the front or rear of the vehicle, and/or an electronic transponder mounted to the vehicle and bearing electromagnetically encoded information able to be read by the communication devices.

The operation of the communication devices is controlled from technical shelters mounted in close proximity to the gantries. In FIG. 1, exemplary technical shelters 13 to 15 respectively forming part of the toll road networks 2, 3 and 41 are illustrated.

Each of the separate toll collection systems 4 to 6 respectively include a central toll computer system 16 to 18. Each central toll computer system is in communication with the technical shelters of a corresponding toll road network. Information captured by the technical shelters is transmitted to one of the central toll computer system for analysis, whilst control information for causing selective operation of the communication devices in each toll road networks is transmitted from each central toll computer system to the technical shelters within each corresponding toll road network.

Each of the central toll computer systems 16 to 18 includes a user identification register including local user records identifying registered users of each of the toll road networks. In this example, the local user identification register of each toll collection system is embodied by a local vehicle register for recording vehicle licence plate numbers of the vehicles owned by users of that particular toll road network that have established and maintain an active account with the operator of that toll road network, and/or a local device register for recording electronic transponder identification information stored in electronic transponders mounted in the vehicles of such users. Those skilled in the art will appreciate that various other types of information enabling the identification of a user of a toll road network maybe stored in like registers forming part of a more general user identification register. Accordingly, the toll collection system 4 maintains a local device register 19 and/or a local vehicle register 20, the toll collection system 5 maintains a local device register 21 and local vehicle register 22, whilst the toll collection system 6 maintains a local device register 23 and a local vehicle register 24.

Each of the toll collection systems further includes a customer relationship management system to facilitate the establishment and maintenance of user information and user account details, maintained by each corresponding central toll computer system. In the example, shown in FIG. 1, the toll collection systems 4 to 6 respectively include customer relationship management systems 25 to 27.

One of the toll road networks 2, 3 and 41 would typically be more frequently used by an individual user than the others, that toll road network being considered to be that user's "home" or "local" toll road network with an established customer agreement for payment of tolls incurred. For users having the toll road network 2 as a local toll road network, user identification information would be provided to the central toll computer system 16. The vehicle licence plate number of a vehicle owned by that user may be stored in the local vehicle register 20, electronic transponder identification information borne by an electronic transponder issued to that user stored in the local device register 19, and an account enabling use of the toll road system 2 by that user then established.

In accordance with the present invention, the toll debiting system 1 also includes a central tolling information exchange 28, in communication with each of the central toll computer systems 16 to 18 via a communications network 29, such as the Internet or Public Switched Telephone Network (PSTN). The central tolling information exchange 28 maintains a global user identification register including global user records identifying one or more selected users of the separate toll road networks 2, 3 and 41. In this example, the global user identification register is embodied by a global vehicle register 30 and a global device register 31. As will be described below, the central tolling information exchange 28 and associated global device register 31 and global vehicle register 30 together enable a registered user of a local toll road network to additionally make use of other separate toll road networks, and to be charged for use of that other toll road network, without requiring the establishment of separate accounts for those other toll road networks.

Figure 2:
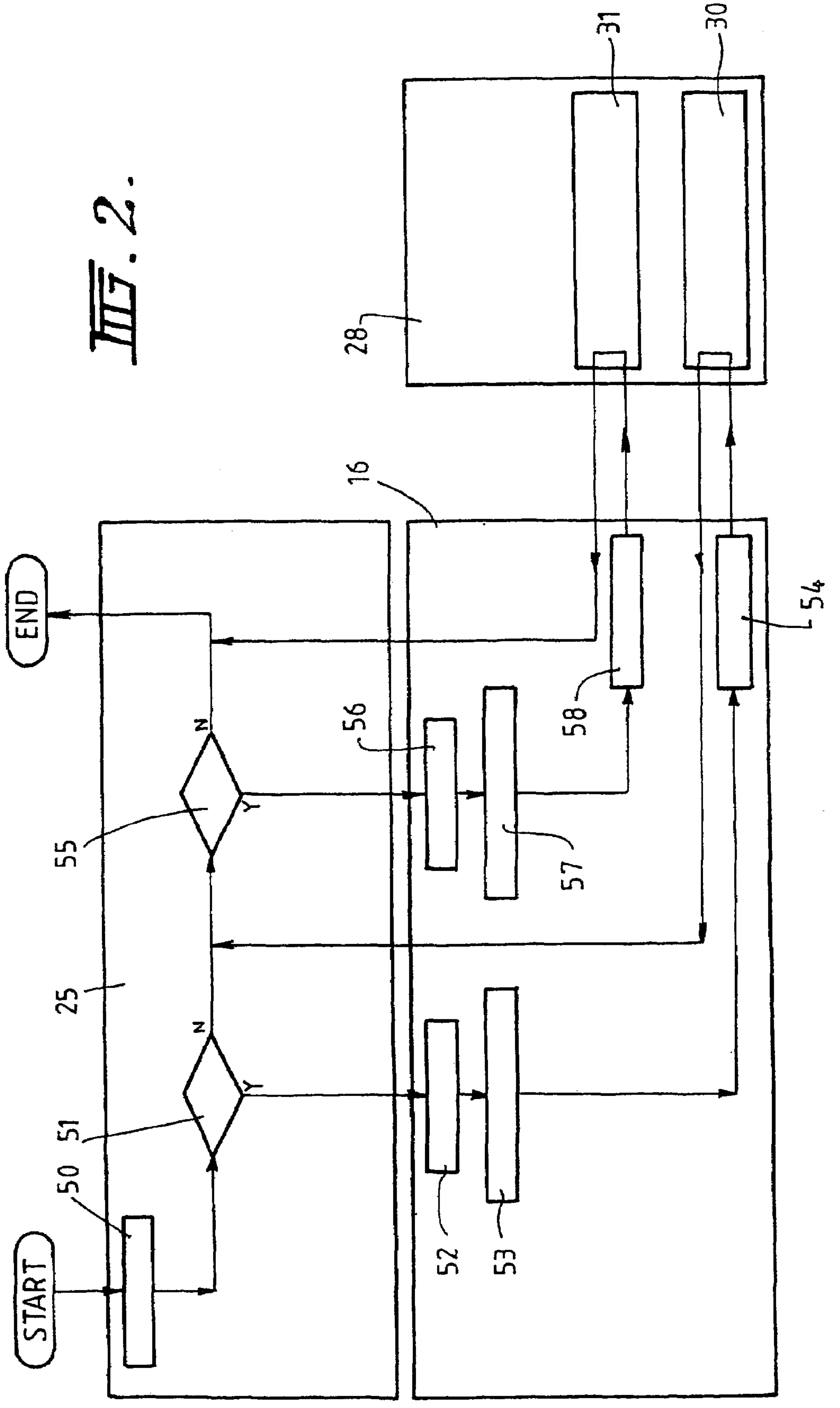
FIGS. 2 and 3 are flow charts illustrating the creation of local and global user records to enable operation of the toll debiting system of FIG. 1.

As seen in FIG. 2, the details of a user wishing to establish an account for use of the toll road network 2 are initially captured at step 50 by the customer relationship management system 25. These details may typically include the user's vehicle licence plate number, details enabling identification of an electronic transponder which may be issued to the user, the user's name, address and account number to enable tolls incurred by the user to be automatically debited from a bank account or credit card. If the customer relationship management system 25 determines at step 51 that the user has not previously provided details identifying his vehicle, or has updated those details, the vehicle licence plate number and other vehicle identification information is transmitted to the central toll computer system 16. Details of the user's vehicle are processed at step 52, and at step 53 a local user record is created or updated to include the users vehicle licence plate number.

In the embodiment shown in FIG. 2, the central toll computer system 16 is programmed to automatically provide the updated vehicle licence plate number information to the central tolling information exchange 28. Accordingly, at step 54, the vehicle licence plate number and other vehicle identification details are transmitted to the central tolling information exchange 28 and a global user record identifying the users vehicle licence plate number is created in the global vehicle register 30.

Similarly, if it is determined at step 55 that a user has not previously been issued with an electronic transponder, or has updated that electronic transponder, details of the electronic transponder are transmitted from the customer relationship management system 25 to the central toll computer system 16 for processing at step 56. At step 57, a local user record including the electronic transponder identification information is created in the local device register 19. At step 58, the electronic transponder identification information is transmitted to the central tolling information exchange 28, and a corresponding global user record created in the global device register 31 enabling identification of the users electronic transponder.

Figure 3:
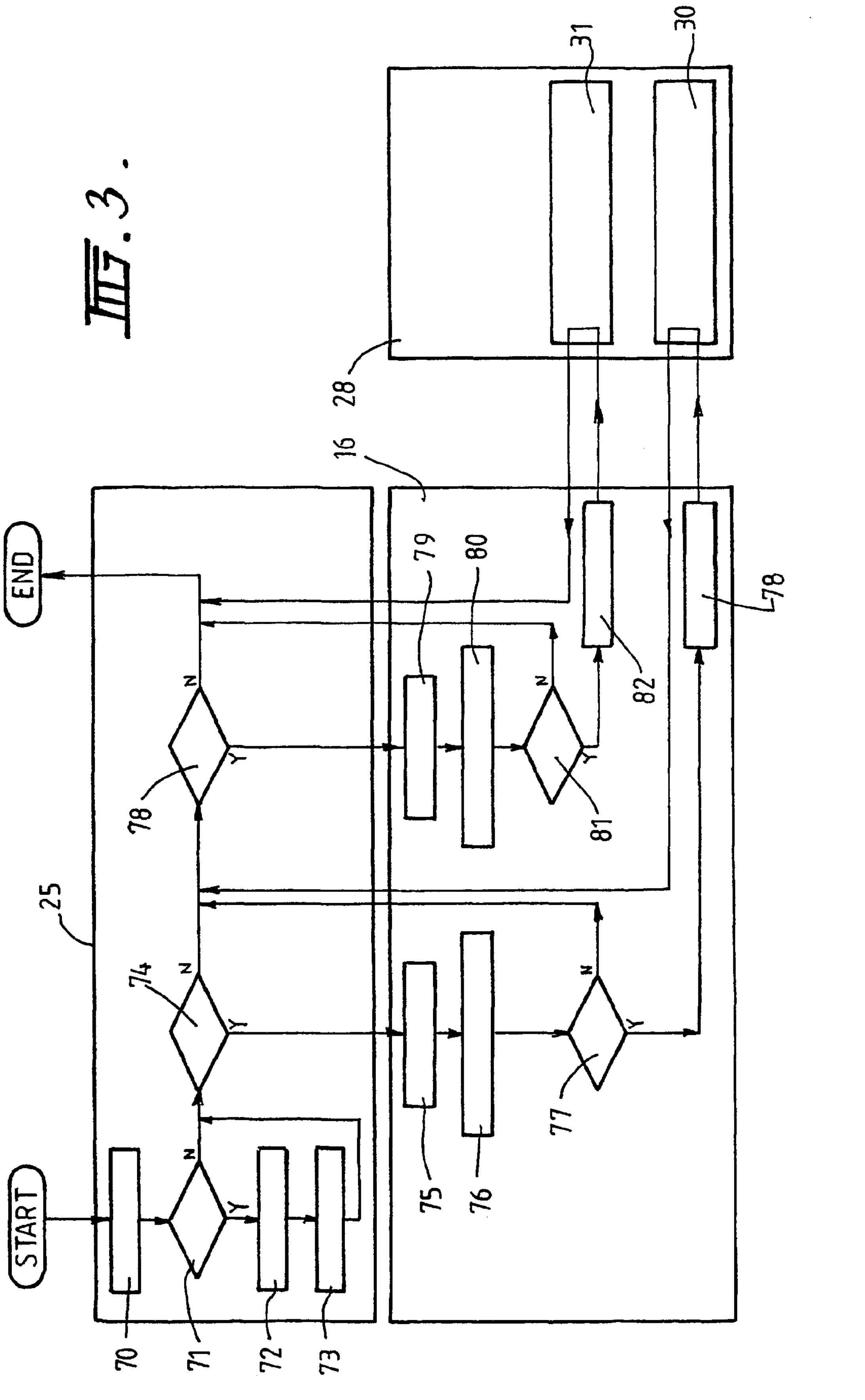

Alternatively, the creation of the global user records in the global device register 31 and global vehicle register 30 may depend upon a request being made by that user. As seen in FIG. 3, once the user's details are captured at step 70, a determination may be made at step 71 as to whether the user has requested to be able to use the toll road networks 3 and 4. If this request has been made, an assessment may be made at step 72 as to whether this service is to be provided to that user, and if so, a flag set at step 73. If it is determined at step 74 that user vehicle details have not been previously captured or are being updated, the user vehicle details are transmitted at step 75 to the central toll computer system and a local user record identifying the user's licence plate number is created at step 76 in the local vehicle register 20. Thereafter, at step 77, the central toll computer system 16 detects whether the flag enabling use of the toll road networks 3 and 4 by the user has been set. If this is the case, the user vehicle details are transmitted at step 78 to the central tolling information exchange 28 for the creation or updating of a global user record in the global vehicle register 30. Similarly, if it is determined at step 79 that the user has not provided or is updating details of an electronic transponder, electronic transponder identification information is processed at step 79 by the central toll computer system 16, and at step 80 a local user record created in the local device register 19 to enable identification of the user from detection of that electronic transponder. If it is determined at step 81 that the flag has been set at step 73, the electronic transponder identification information is transmitted at step 82 to the central tolling information exchange 28 and a global user record created in the global device register 31.

Figure 4:
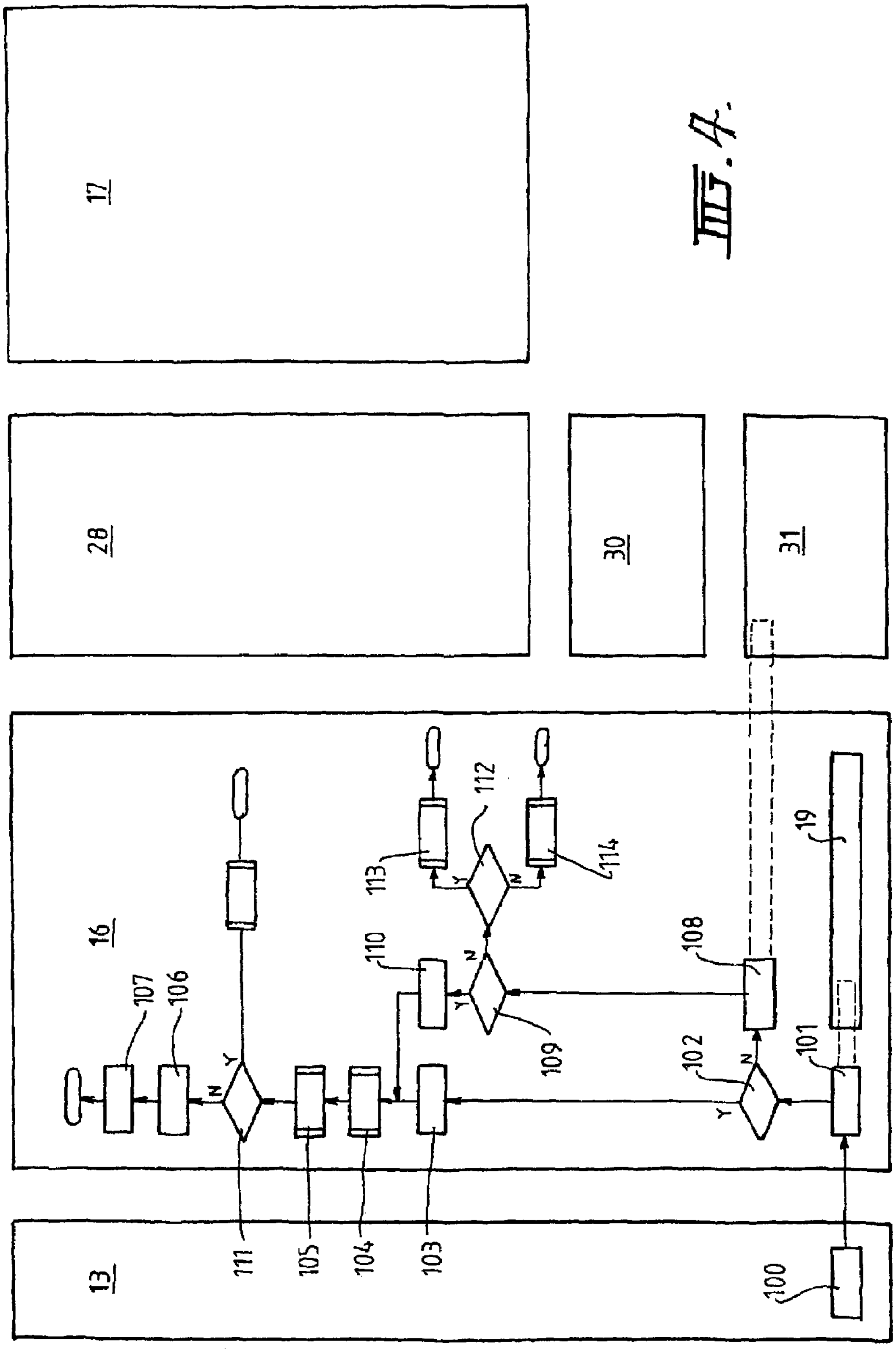
FIGS. 4 to 7 are flow charts illustrating the operation of the toll debiting system of FIG. 1 in the processing of tolls incurred by users of the system shown in FIG. 1.

As seen in FIG. 4, when an electronic transponder mounted in a vehicle travelling on the toll road network 2 is detected by the communication devices mounted on the gantries 7, 8, at step 100, the captured electronic transponder identification information is transmitted from the technical shelter 13 to the central toll computer system 16, and an attempt made at step 101 to identify that electronic transponder from the local device register 19. If a corresponding local user record is identified at step 102, the electronic transponder is flagged at step 103 as being local, i.e. the user to whom the electronic transponder was issued has already established an account with the local toll collection system associated with the toll road network. As the vehicle passes under the various gantries and associated communication devices forming part of the toll road network, a trip is reconstructed for that vehicle at step 104 and a toll charge incurred by the user for the use of the toll road network 2 is derived. If the toll collection system charges tolls for each single detection on the toll road network then it may not be necessary to reconstruct a trip at step 104. At step 106, the users account is debited and at step 107 the users account details are updated.

Alternatively, if the central toll computer system 16 was unable to identify a local user record in the local device register 19 corresponding to the detected electronic transponder identification information, an attempt is made at step 108 to locate a global user record identifying that user from the global device register 31. If, at step 109, it has been determined that the identification attempt was successful, the electronic transponder is flagged as being foreign at step 110, i.e. the electronic transponder corresponding to the detected electronic transponder identification information was issued to a registered user of one of the "foreign" toll road networks 3 or 41.

As was the case previously, the passage of the vehicle under the gantries forming part of the toll road network 2 is detected by the communication devices mounted thereon, and a trip reconstructed for that vehicle at step 104. At step 105, the toll charge incurred by that user is derived. In this case, however, if it is determined that step 111 that the electronic transponder is "foreign", the toll charge is transmitted to the central tolling information exchange 28 for processing by the foreign toll collection system for which the user is recorded as a local user.

If a user record corresponding to the detected electronic transponder identification information is found in neither the local device register 19 or the global device register 31, an assessment is then made at step 112 as to whether an image of the vehicle licence plate number is available. If this is the case, an infringement record is generated at step 113 and the infringement record is transmitted to an enforcement agency such as a local police force for further processing of the incurred toll or the issuing of a penalty or other notice. If no image is available, a further follow up action is performed at step 114.

Returning to the situation where it has been determined at step 111 that a toll charge has been incurred by a user registered as a local user by one of the foreign toll road networks 3 or 41, a foreign transaction record is created at step 130 (see FIG. 5) and then transmitted from the local central toll computer system 16 to the central tolling information exchange 28 at step 131. Upon receipt of the foreign transaction detail by the central tolling information exchange 28 at step 132, an acknowledgment is generated at step 133 and transmitted to the local central toll computer system 16. The, acknowledgment is received at step 134, and reconciliation details stored at step 135 by the local central toll computer system 16. At step 136, the central tolling information exchange uses the electronic transponder identification information transmitted to it from the local central toll computer system 16 to identify the foreign toll road network having registered the user to whom the electronic transponder was issued as a local user. Once that toll road network has been identified, the foreign transaction record is transmitted at step 137 to the foreign central toll computer system in question (in this example, the central toll computer system 18). The foreign transaction record is received by the central toil computer system 18 at step 138 and an acknowledgment generated at step 139 for transmission to central tolling information exchange 28. At step 140, this acknowledgment is received by the central tolling information exchange 28 and details confirming delivery of the foreign transaction record to the appropriate foreign central toll computer system recorded at step 141.

Reconciliation details are then stored at step 142 by the foreign central toll computer system 18 and a charge for the use of the toll road network 2 processed at step 143. In instances where it is decided at step 144 not to charge the user for use of the toll road network 2, a follow-up action is created at step 145 and then transmitted to the customer relationship management system 25 at step 146.

Figure 6:
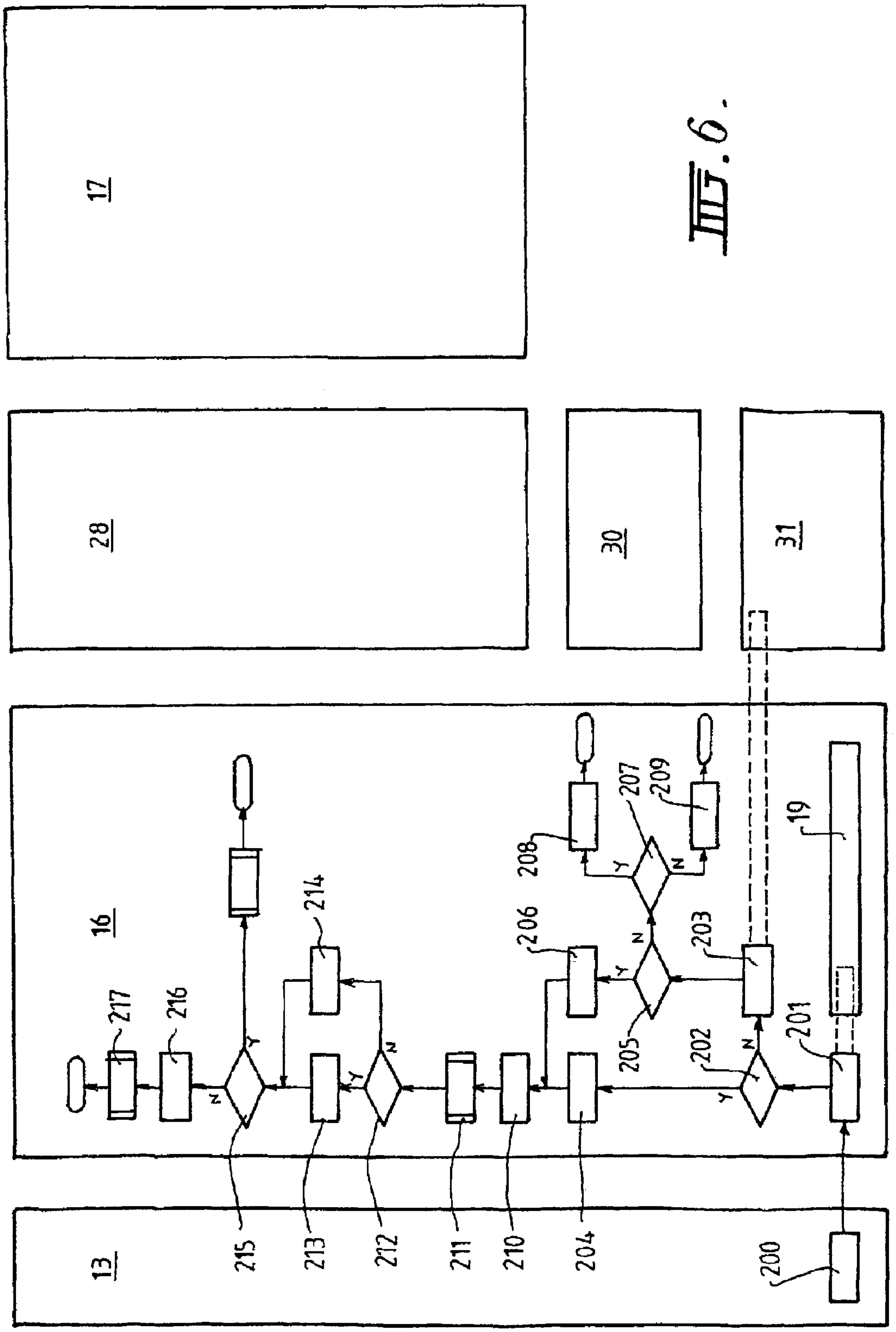

Rather than charging an account maintained by one or more of the toll collection systems 4 to 6, toll charges incurred for use of one or more of the toll road networks may be charged by means of a smart card, i.e. a card or other device bearing electromagnetically recorded information detectable by a communication device within a toll road network and associated with an externally maintained bank or credit account. The steps performed by the local central toll computer system 16 are shown in FIG. 6. Accordingly, at step 200, identification information is read from the user's smart card by one of the communication devices associated with the toll road network 2. At step 201, an attempt is made to locate a local user record in the local device register 19 enabling identification of the smart card having been detected. If the attempt is determined at step 202 to be unsuccessful, a further attempt is made at step 203 to locate a global user record identifying that user's smart card in the global device register 31.

If a local user record was identified, the smart card is flagged as being local at step 204. Otherwise, a determination is made whether the attempt to locate a corresponding global user record was successful at step 205. If a corresponding global user record was identified, the smart card is flagged at step 206 as being foreign. If not, a determination is made at step 206 as to whether an image of the users vehicle licence plate number is available. If the image is available, an infringement record is generated and transmitted to an enforcement agency at step 208. If an image is not available, a further follow up action is undertaken at step 209.

At step 210, the central toll computer system 16 determines whether a toll was deducted from the smart card. At step 211, the expected toll charge is calculated. At step 212, the central toll computer system 16 determines whether the charge was able to be debited from the smart card. If the debiting was successful, a flag is generated at step 213 indicating the charge has been paid. Otherwise, a flag is generated at step 214 indicating that the toll charge incurred has yet to be paid. At step 215, a determination is made as to whether the smart card was identified from a global user record in the global device register 31. If this was not the case, the smart card is assumed to have been assigned to a local user, and that users account updated at step 216. Reconciliation details are then recorded at step 217.

Figure 5:
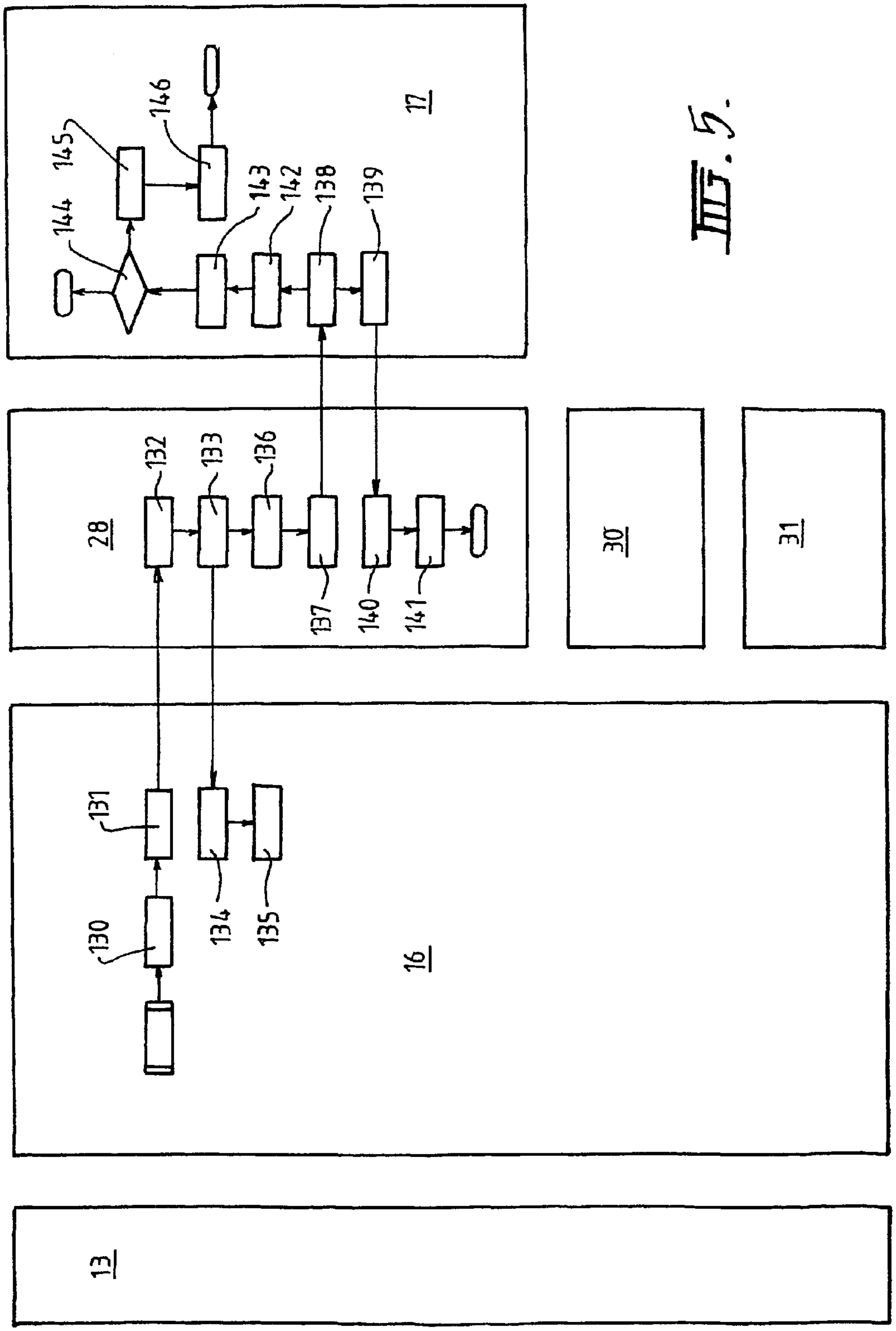

If the user is identified as a foreign user at step 215, the toll charge incurred by the user for use of the toll road network 2 is processed in the manner described in relation to FIG. 5.

Figure 7:
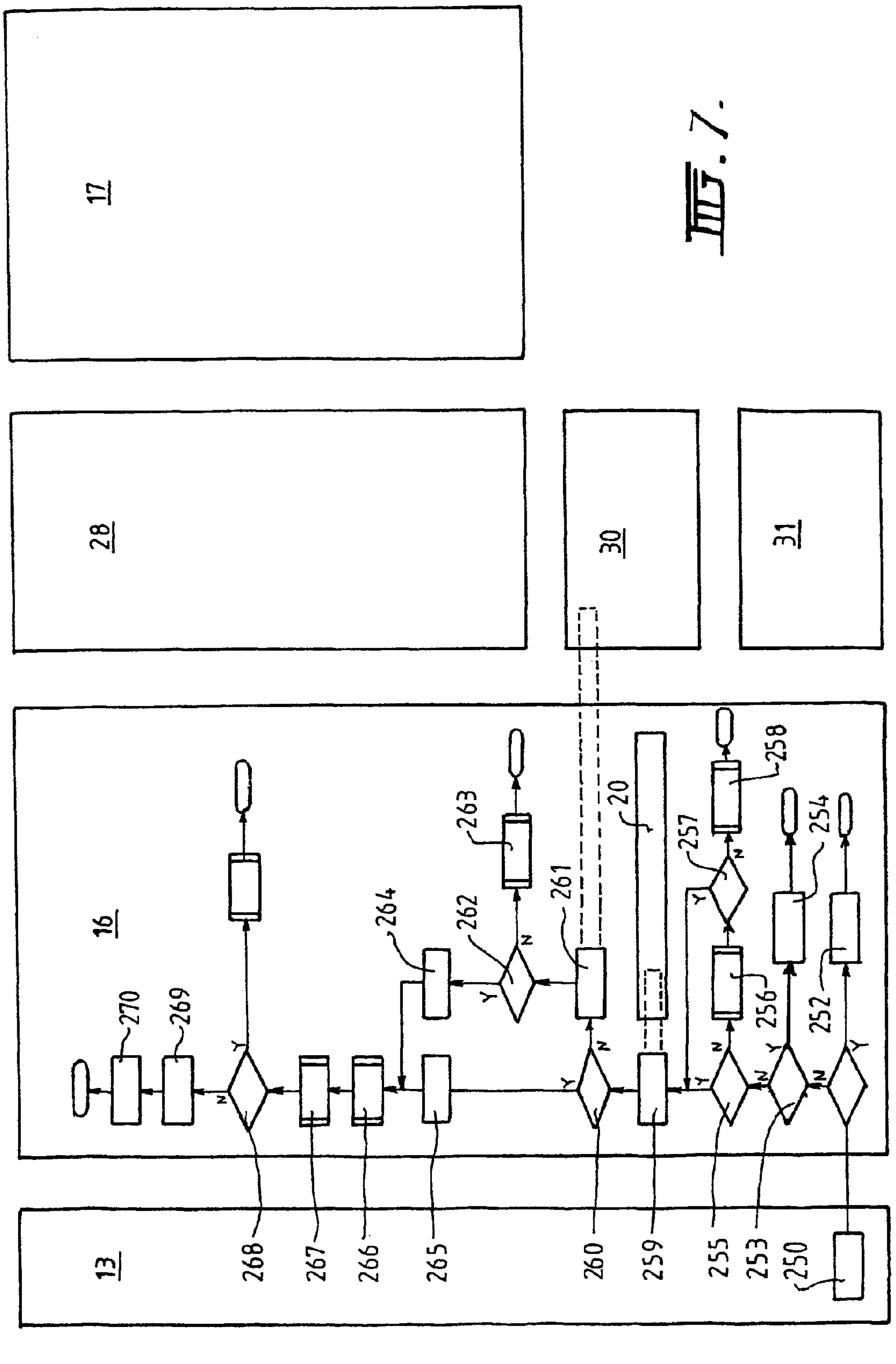
Figure 8:
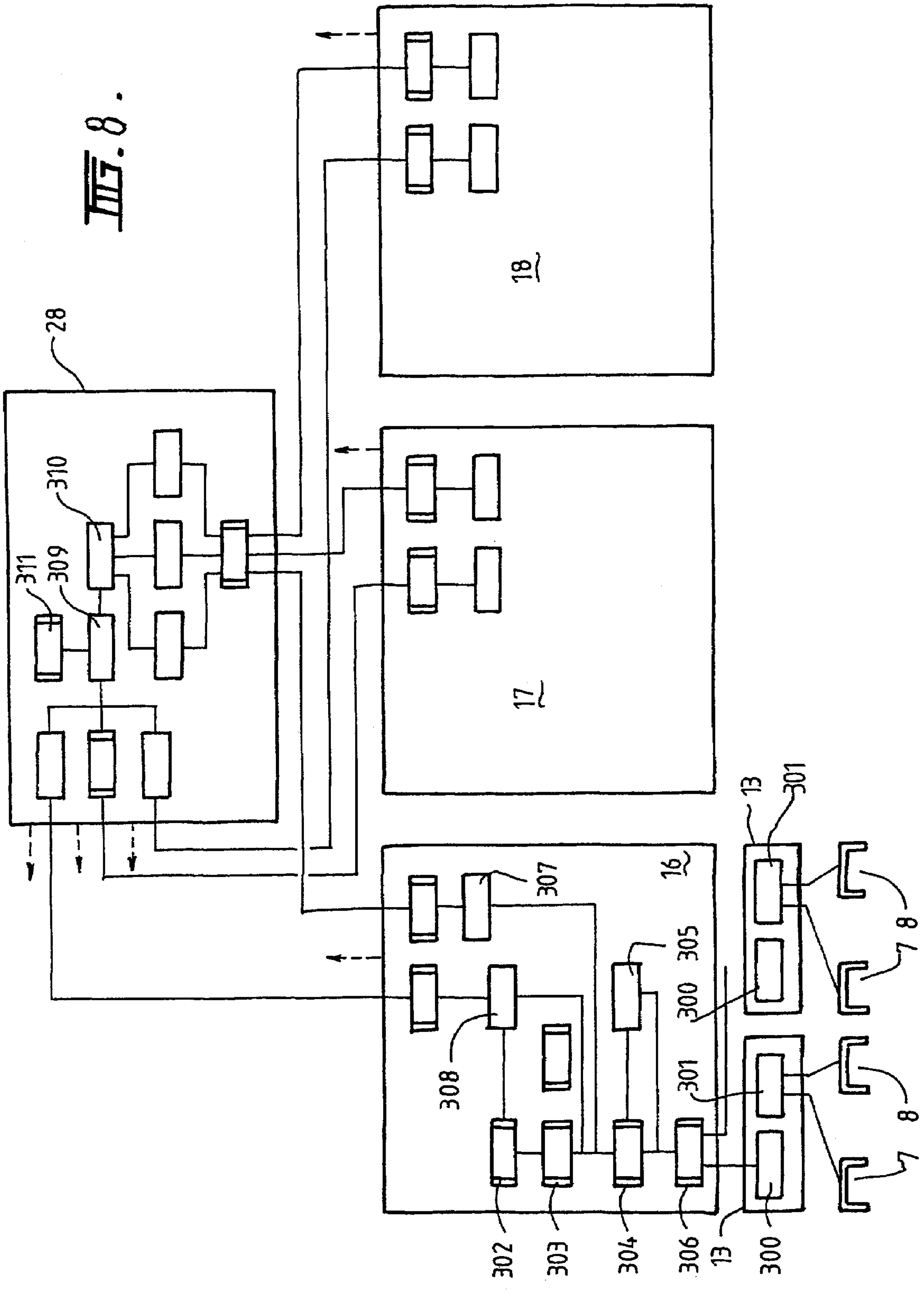
FIG. 8 is a flow chart illustrating the operation of the toll debiting system of FIG. 1 in the performance of predefined tolling actions.

FIG. 7 illustrates the manner in which the processing of toll charges is handled when the user identification is based upon a detected vehicle licence plate number. At step 250, a communications device mounted on the gantries 7, 8 forming part of the toll road network 2 captures an image of a vehicle licence plate number as a users vehicle passes under the gantry.

A toll road network may allow a vehicle to use the toll road by purchasing a temporary pass for a defined period of time, such as a day or weekend. Many toll road networks can check a vehicle licence plate number against a Temporary Pass List maintained at the technical shelter.

Step 251 determines if the vehicle licence plate number was matched at the technical shelter. If so, statistics are kept at step 252 and no further action is taken.

If no match at step 251, the central toll computer system 16 tries to match the vehicle licence plate number with Temporary Passes held by the central toll computer system 16, at step 253.

If a match was found at step 253, statistics are kept at step 254 and no further action is taken.

At step 255, if the central toll computer system 16 requires a vehicle licence plate number to be verified it is passed to a human operator at step 256. Step 257 determines whether the licence plate number can be accurately read. If not, the image is deleted at step 258 and no further action is taken.

At step 259, an attempt is made to identify the detected licence plate number in a local user record previously created within the local vehicle register 20. If it is determined at step 260 that this attempt has been unsuccessful, then an attempt is made at step 261 to locate the detected vehicle licence plate number from a global user record maintained in the global vehicle register 30. If it is determined at step 262 that the vehicle licence plate number has not been detected from the global vehicle register 30, an infringement record is generated and transmitted at step 263 to an enforcement agency. However, if the vehicle licence plate number has been successfully identified, the vehicle is flagged as foreign at step 264.

If it was determined at step 260 that the vehicle licence plate number was identifiable from the local vehicle register 20, then the vehicle is flagged at step 265 as being local.

At step 262 the trip details of that user are reconstructed if required by the toll road network, and a toll charge calculated at step 267. If it is determined at step 268 that the user is a local user, then that user's account is charged at step 269 and the account details updated at step 270. In the case of the user being flagged as a foreign user, the toll charge incurred by the user is processed as a foreign vehicle transaction in accordance with the process illustrated in FIG. 5.

From the foregoing, it will be apparent that it may be necessary under various circumstances to identify a user using more than one identification device. For example, if an electronic transponder is detected at step 100, but that transponder is unable to be identified from either the local device register 19 or the global device register 31, pursuing payment for the incurred toll will only be possible if an image of the vehicle licence plate number—thus enabling identification of the vehicle and the vehicles registered owner—has been captured. Accordingly, a local action list may be maintained by each toll collection system to determine which combination of user identification methods are to be enacted upon the passage of a vehicle under a gantry of that corresponding toll road network. For example, when an electronic transponder has been previously issued to a user, but that user is no longer authorised to use a particular toll road network, the electronic transponder identification information of that user may have been removed from both local device register 19 and the global device register 31. In these circumstances, it will be desirable to record an image of the user's vehicle licence plate number in order that payment of any toll incurred and/or enforcement of any penalty can be pursued. Accordingly, a local action list 300 identifying selected users may be maintained by the technical shelters 13 of the toll road network 2. Information recorded in these local action lists causes selective detection and checking, at step 301, of identity of a vehicle user on the toll road network 2. The local action list 300 is created by the local central toll computer system 16 by the generation, at step 302, of a local hot list of unauthorised users and a local notify list at step 303. These two lists are then combined at step 304 and an action list generated at step 305 for transmission to the technical shelters 13 at step 306.

In order to improve the information exchange between the separate toll collection systems 4 to 6, a foreign action list 307 is also downloaded by each central toll computer system. The foreign action list 307 is created by the central tolling information exchange 28 from local action lists generated by the other central toll computer systems 17 and 18. In this way, users still in possession of an electronic transponder issued by one of the toll road networks 3 or 41 but having had their account suspended or cancelled will be unable to use the toll road network 2 with impunity since local action lists for each toll separate collection system are transmitted to the other toll collection systems and multiple user identification techniques used in those toll collection systems.

Accordingly, a local action list 308 generated by one of the central toll computer systems is transferred to the central tolling information exchange for redistribution to the other toll collection systems. The central tolling information exchange 28 acts to receive each of the foreign action lists at step 309 and then at step 310 redistributes the action lists to each of the other toll collection systems. A brokerage charge may be calculated at step 311 for performing this action. Thereafter, each toll collection system may use the local and foreign action lists to initiate one or more predetermined actions upon detection of one or more user identification devices associated with a selected user.

It will be appreciated that the customer relationship management systems, central toll computer systems, technical shelters and the central tolling information exchange all include processing devices and memory devices for storing computer program code causing the processing devices to perform the above described functionality. Moreover, it will be understood that information may be transmitted between the various components of the tolling information exchange system either in real-time or via the transmission batch files.

Finally, it is to be understood that various modifications and/or additions may be made to the method and system for debiting tolls against vehicles travelling on multiple toll road networks, and the various features and steps of that system and method without departing from the spirit or ambit of the present invention.

What is claimed is:

1. A method for debiting tolls against vehicles travelling on multiple toll road networks, the tolls incurred in each toll road network being processing by a separate toll collection system, the method including the steps of:

(a) creating a local user record identifying a user of a first of the toll road networks in a first local user identification register maintained by a first of the toll collections systems, (b) creating a global user record identifying the user in a global user identification register maintained by a central tolling information exchange, (c) detecting the presence of a user identification device associated with the user on a second toll road network, (d) attempting to locate a second local user record identifying the user from a second local user identification register maintained by a second of the toll collection systems, and if unsuccessful, (e) attempting to locate the global user record identifying the user from the global user identification register, and if successful, (f) deriving a toll charge incurred by the user on the second toll road network.

2. A method according to claim 1, the method further including:

selectively creating a global user record for the user.

3. A method according to claim 2, wherein the global user record is created upon or following creation of the first local user record.

4. A method according to any claim 1, wherein the user identification device bears electromagnetically encoded information identifying the user.

5. A method according to claim 4, wherein the user identification device is an electronic transponder.

6. A method according to claim 4, wherein the user identification device is a smart card.

7. A method according to claim 4, wherein global user identification register includes a global device register for recording the electromagnetically encoded user information.

8. A method according to claim 1, wherein the user identification device is a vehicle license plate.

9. A method according to claim 8, wherein the global user identification register includes a global vehicle register for recording vehicle license plate numbers.

10. A method according to claim 1, the method further including the step of:

(g) forwarding a toll charge record to the first toll collection system for processing.

11. A method according to claim 10, wherein step (g) includes:

transmitting the toll charge record from the second toll collection system to the central tolling information exchange, receiving an acknowledgment from the central tolling information exchange of the toll charge record, and storing reconciliation data in the second toll collection system for later reconciliation with the first toll collection system.

12. A method according to claim 10, wherein step (g) includes:

identifying the user as having a first local user record in the local user identification register, transmitting the toll charge record from the central tolling information exchange to the first toll collection system, receiving acknowledgment from the first toll collection system of the toll charge record, and debiting the user for the toll charge incurred in the second toll road network.

13. A method according to any claim 1, the method further including the steps of:

(h) debiting the toll charge within the second toll collection system, and (i) transmitting a toll charge record to the first toll collection system for archiving.

14. A method according to claim 1, the method further including the steps of:

(j) if the attempt to locate the global user record from the global user identification register at step (e) is unsuccessful, generating an infringement record, and (k) transmitting the infringement record to an enforcement agency.

15. A method according to claim 1, the method further including the steps of:

(l) maintaining a local action list in each toll collection system identifying unauthorised users of that toll road network, (m) maintaining a foreign action list in each toll collection system identifying unauthorised users of one or more other toll road networks, (n) transmitting each local action list to the central tolling information exchange for redistribution to the other toll collection systems, (o) at each toll collection system, storing received local action lists in the foreign action list, and (p) at each toll collection system, using the local and foreign action lists to initiate one or more predetermined actions upon detection of the user identification device of an unauthorised user.

16. A system for debiting tolls against vehicles travelling on multiple toll road networks, the system including:

a plurality of toll collection systems for processing the tolls incurred in each of the multiple toll road network, a plurality of local user identification registers each maintained by a separate toll collection system, a central tolling information exchange operatively connected to the plurality of toll collection systems, and a global user identification register maintained by the central tolling information exchange, wherein the plurality of toll collection systems and the central tolling information exchange each include processing devices and memory devices storing computer program code causing the processing devices to carry out a method according to any one of the preceding claims.

17. A central tolling information exchange for facilitating the exchange of information between multiple road toll networks, the central tolling information exchange forming part of a system for debiting tolls against vehicles travelling on multiple toll road networks, the tolls incurred in each toll road network being processing by a separate toll collection system, wherein a first local user record identifying a user of a first toll road network is created in a first local user identification register maintained by a first toll collection system, the central tolling information exchange including a processing device and memory device storing computer program code causing the processing device to:

(a) create a global user record identifying the user in a global user identification register maintained by a central tolling information exchange, upon detection of the presence of a user identification device associated with the user on a second toll road network, and unsuccessfully attempting to locate a second local user record identifying the user from a second local user identification register maintained by a second of the toll collection systems, (b) search for a global user record identifying the user from the global user identification register, and (c) transmit the results of the search to the second toll collection system.

18. A central tolling information exchange according to claim 17, wherein upon a toll charge being incurred by the user on the second road toll network, the computer program code further causes the processing device to:

forward a toll charge record representative of the toll charge to the first toll collection system.

19. A central tolling information exchange according to claim 18, wherein the computer program code further causes the processing device to:

receive the toll charge record from the second toll collection system, transmit an acknowledgment of the toll charge record to the second toll collection system.

20. A central tolling information exchange according to claim 18, wherein the computer program code further causes the processing device to:

transmit the toll charge record to the first toll collection system, and receive acknowledgment from the first toll collection system of the toll charge record.

21. A central tolling information according to claim 17, wherein the computer program code further causes the processing device to:

selectively create a global user record for the user.

22. A central tolling information according to claim 21, wherein a global user record is created upon or following creation of the first local user record.

23. A central tolling information exchange according to claim 17, wherein the computer program code further causes the processing device to:

receive a local action list maintained by the first toll collection system identifying unauthorised users of the first toll road network, and transmit the local action list to the second toll collection system.

24. A computer program including computer program code for use with a central tolling information exchange according to claim 17.

25. A toll collection system adapted to exchange information with one or more other toll collection systems, the toll collection system forming part of a system for debiting tolls against vehicles travelling on multiple toll road networks, the tolls incurred in each toll road network being processing by a separate toll collection system, wherein a local user record identifying a user of a first of the toll road networks is created in a first local user identification register maintained by a first of the other toll collections systems, and a global user record identifying the user is created in a global user identification register maintained by a central tolling information exchange, the toll collection system including a processing device and memory device storing computer program code causing the processing device to:

(a) detect the presence of a user identification device associated with the user on a second toll road network, (b) attempt to locate a second local user record identifying the user from a second local user identification register maintained by the toll collection system, and if unsuccessful, (c) attempt to locate the global user record identifying the user from the global user identification register, and if successful, (d) derive a toll charge incurred by the user on the second toll road network.

26. A toll collection system according to claim 25, wherein the computer program code further causes the processing device to:

forward a toll charge record to the first toll collection system for processing.

27. A toll collection system according to claim 26, wherein the computer program code further causes the processing device to:

transmit the toll charge record to the central tolling information exchange, receive an acknowledgment from the central tolling information exchange of the toll charge record, store reconciliation data for later reconciliation with the first toll collection system.

28. A toll collection system according to claim 27, wherein the computer program code further causes the processing device to:

debit the toll charge, and transmit a toll charge record to the first toll collection system for archiving.

29. A toll collection system according to claim 28, wherein the computer program code further causes the processing device to:

generate an infringement record if the attempt to locate the global user record from the global user identification register is unsuccessful, and transmit the infringement record to an enforcement agency.

30. A toll collection system according to claim 25, wherein the computer program code further causes the processing device to:

maintain a local action list identifying unauthorised users of the second toll road network, maintain a foreign action list identifying unauthorised users of the one or more other toll road networks, transmit the local action list to the central tolling information exchange for redistribution to the other toll collection systems, store received local action lists in the foreign action list, and use the local and foreign action lists to initiate one or more predetermined actions upon detection of the user identification device of an unauthorised user.

31. A computer program including computer program code for use with a toll collection system according to claim 25.

* * * * *